United States Patent
Nakahira et al.

(10) Patent No.: US 12,127,113 B2
(45) Date of Patent: Oct. 22, 2024

(54) WIRELESS COMMUNICATION SYSTEM, CONTROL STATION, BASE STATION, AND WIRELESS COMMUNICATION METHOD

(71) Applicant: Nippon Telegraph and Telephone Corporation, Tokyo (JP)

(72) Inventors: Toshiro Nakahira, Musashino (JP); Hirantha Abeysekera, Musashino (JP); Koichi Ishihara, Musashino (JP); Tomoki Murakami, Musashino (JP); Takafumi Hayashi, Musashino (JP); Yasushi Takatori, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 396 days.

(21) Appl. No.: 17/632,266

(22) PCT Filed: Aug. 7, 2019

(86) PCT No.: PCT/JP2019/031062
§ 371 (c)(1),
(2) Date: Feb. 2, 2022

(87) PCT Pub. No.: WO2021/024400
PCT Pub. Date: Feb. 11, 2021

(65) Prior Publication Data
US 2022/0286955 A1    Sep. 8, 2022

(51) Int. Cl.
*H04W 48/00*    (2009.01)
*H04W 48/20*    (2009.01)
(Continued)

(52) U.S. Cl.
CPC ........... *H04W 48/20* (2013.01); *H04W 76/18* (2018.02)

(58) Field of Classification Search
CPC ..... H04W 48/00; H04W 48/02; H04W 48/06; H04W 48/18; H04W 48/20; H04W 76/00; H04W 76/10; H04W 76/11; H04W 76/18
See application file for complete search history.

(56) References Cited

U.S. PATENT DOCUMENTS 8,620,374 B2 * 12/2013 Nakamura ............ H04W 72/20
                                                                455/522
9,432,850 B2 *  8/2016 Morita .................. H04W 16/10
(Continued)

FOREIGN PATENT DOCUMENTS

JP    2007067745    3/2007
JP    2017038126    2/2017

OTHER PUBLICATIONS

LAN/MAN Standards Committee of the IEEE Computer Society, "Part 11: Wireless LAN Medium Access Control (MAC) and Physical Layer (PHY) Specifications," IEEE Std 802.11-2016 (Revision of IEEE Std 802.11-2012) IEEE Standard for Information technology—Telecommunications and information exchange between systems Local and metropolitan area networks—Specific requirements, Dec. 14, 2016, 3534 pages.

*Primary Examiner* — Quochien B Vuong
(74) *Attorney, Agent, or Firm* — Fish & Richardson P.C.

(57) ABSTRACT

Included are a plurality of base stations to which a plurality of terminal stations are connectable and a control station that controls each of the base stations. The control station includes a network communication unit that receives, from each of the base stations, base station information indicating the base station, wireless environment information indicating a reception signal received by the base station from another of the base stations and a signal intensity thereof, and terminal station information indicating the terminal station connected to the base station and a signal intensity and a calculation unit that calculates, based on the base (Continued)

station information, the wireless environment information, and the terminal station information each received from each of the base stations, connection control information for controlling a connection permission from each of the base stations to each of the terminal stations. Each of the base stations includes a connection control unit that controls, based on the connection control information, the connection permission to each of the terminal stations.

15 Claims, 9 Drawing Sheets

(51) Int. Cl.
*H04W 76/00* (2018.01)
*H04W 76/18* (2018.01)

(56) References Cited

U.S. PATENT DOCUMENTS

| | | |
|---|---|---|
| 10,200,940 B2* | 2/2019 | Yuda ................ H04W 48/06 |
| 2007/0047480 A1 | 3/2007 | Suga |
| 2019/0199458 A1* | 6/2019 | Fukuhara ............ H04W 76/10 |

\* cited by examiner

Fig. 3

WIRELESS ENVIRONMENT INFORMATION

| RECEIVER INFORMATION | BASE STATION WIRELESS INFORMATION | | | |
|---|---|---|---|---|
| BSSID | SSID | BSSID | RSSI | CHANNEL |
| CC:CC:CC:CC:CC:CC | AAA | AA:AA:AA:AA:AA:AA | -60dBm | 36ch |
| CC:CC:CC:CC:CC:CC | BBB | BB:BB:BB:BB:BB:BB | -65dBm | 1ch |
| ⋮ | ⋮ | ⋮ | ⋮ | ⋮ |

Fig. 4

TERMINAL STATION INFORMATION

| ACQUIRER INFORMATION | TERMINAL STATION WIRELESS INFORMATION | | | TERMINAL STATION PERFORMANCE INFORMATION | |
|---|---|---|---|---|---|
| BSSID | MAC ADDRESS | RSSI | ... | COMPLIANT WITH 802.11v | ... |
| CC:CC:CC:CC:CC:CC | AB:AB:AB:AB:AB:AB | -65dBm | ... | COMPLIANT | ... |
| CC:CC:CC:CC:CC:CC | CD:CD:CD:CD:CD:CD | -70dBm | ... | NON-COMPLIANT | ... |
| ⋮ | ⋮ | ⋮ | ⋮ | ⋮ | ⋮ |

Fig. 5

BASE STATION INFORMATION

| | | |
|---|---|---|
| BASE STATION MAIN BODY | MAC ADDRESS | AA:AA:AA:AA:AA:AA |
| | NUMBER OF WIRELESS INTERFACES | 2 |
| | ⋮ | ⋮ |
| FIRST WIRELESS INTERFACE | MAC ADDRESS | AA:AA:AA:AA:AA:A1 |
| | OPERATING CHANNEL | 36ch |
| | ⋮ | ⋮ |
| SECOND WIRELESS INTERFACE | MAC ADDRESS | AA:AA:AA:AA:AA:A2 |
| | OPERATING CHANNEL | 1ch |
| | ⋮ | ⋮ |
| ⋮ | ⋮ | ⋮ |

Fig. 6

CONNECTION DESTINATION CONTROL INFORMATION
(FIRST EXAMPLE)

| | |
|---|---|
| CONNECTION CONTROL TARGET TERMINAL STATION | AB:CD:EF:AB:CD:EF |
| CONNECTION CONTROL METHOD | 802.11v |
| CONNECTION SWITCH DESTINATION BSSID | DD:DD:DD:DD:DD:DD |
| CONNECTION SWITCH DESTINATION CHANNEL | 40ch |
| ⋮ | ⋮ |

| CONNECTION DESTINATION CONTROL INFORMATION (SECOND EXAMPLE) ||
|---|---|
| CONNECTION CONTROL TARGET TERMINAL STATION | AB:CD:EF:AB:CD:EF |
| CONNECTION CONTROL METHOD | Disassociation |
| CONNECTION SWITCH DESTINATION BSSID | — |
| CONNECTION SWITCH DESTINATION CHANNEL | — |
| ⋮ | ⋮ |

Fig. 9

AREA OVERLAP INFORMATION

|  | BASE STATION 20-1 | BASE STATION 20-2 | BASE STATION 20-3 | BASE STATION 20-4 | ... |
|---|---|---|---|---|---|
| BASE STATION 20-1 | | | | | |
| BASE STATION 20-2 | -70dBm ○ | | | | |
| BASE STATION 20-3 | -85dBm ✕ | -65dBm ○ | | | |
| BASE STATION 20-4 | — | -83dBm ✕ | -75dBm ○ | | |
| ⋮ | ⋮ | ⋮ | ⋮ | ⋮ | ⋮ |

Fig. 10

CONNECTION DESTINATION INFORMATION

| | CURRENT CONNECTION DESTINATION | BASE STATION 20-1 | BASE STATION 20-2 | BASE STATION 20-3 | BASE STATION 20-4 | ... |
|---|---|---|---|---|---|---|
| TERMINAL STATION 30-1 | BASE STATION 20-1 | ○ | ○ | ✕ | ✕ | ... |
| TERMINAL STATION 30-2 | BASE STATION 20-1 | ○ | ○ | ✕ | ✕ | ... |
| TERMINAL STATION 30-3 | BASE STATION 20-1 | ✕ | ○ | ✕ | ✕ | ... |
| TERMINAL STATION 30-4 | BASE STATION 20-3 | ✕ | ✕ | ○ | ○ | ... |
| ⋮ | ⋮ | ⋮ | ⋮ | ⋮ | ⋮ | ⋮ |

○ : BASE STATION CONNECTION TO WHICH IS PERMITTED   ✕ : BASE STATION CONNECTION TO WHICH IS INHIBITED

Fig. 11

CONNECTION CONTROL INFORMATION (FIRST EXAMPLE)

| CONTROL EXECUTION TIMING | IMMEDIATELY |
|---|---|
| TERMINAL LIST METHOD | CONNECTION INHIBITION LIST |
| TERMINAL LIST | TERMINAL STATION 30-3, TERMINAL STATION 30-4 ··· |
| CONNECTION-INHIBITED-TERMINAL-STATION CONNECTION | INHIBITED |
| CONNECTION-INHIBITED-TERMINAL-STATION CONNECTION DETERMINATION PERIOD | — |
| NUMBER OF TIMES OF CONNECTION-INHIBITED-TERMINAL-STATION CONNECTION DETERMINATION | — |
| ⋮ | ⋮ |

Fig. 12

CONNECTION CONTROL INFORMATION (SECOND EXAMPLE)

| CONTROL EXECUTION TIMING | IMMEDIATELY |
|---|---|
| TERMINAL LIST METHOD | CONNECTION PERMISSION LIST |
| TERMINAL LIST | TERMINAL STATION 30-1, TERMINAL STATION 30-2 |
| CONNECTION-INHIBITED-TERMINAL-STATION CONNECTION | CONDITIONALLY PERMITTED |
| CONNECTION-INHIBITED-TERMINAL-STATION CONNECTION DETERMINATION PERIOD | 10 SECONDS |
| NUMBER OF TIMES OF CONNECTION-INHIBITED-TERMINAL-STATION CONNECTION DETERMINATION | TWICE |
| ⋮ | ⋮ |

WIRELESS COMMUNICATION SYSTEM, CONTROL STATION, BASE STATION, AND WIRELESS COMMUNICATION METHOD

CROSS-REFERENCE TO RELATED APPLICATIONS

This application is a National Stage application under 35 U.S.C. § 371 of International Application No. PCT/JP2019/031062, having an International Filing Date of Aug. 7, 2019. The disclosure of the prior application is considered part of the disclosure of this application, and is incorporated in its entirety into this application.

TECHNICAL FIELD

The present invention relates a wireless communication system, a control station, a base station, and a wireless communication method.

BACKGROUND ART

There are various wireless communication systems each using an unlicensed band. For example, for a high-speed wireless access system using a radio wave in a 2.4 GHz band or a 5 GHz band, the IEEE802.11a standard and the IEEE802.11g standard achieve propagation speeds of up to 54 Mbit/s by using OFDM (Orthogonal Frequency Division Multiplexing) modulation (see, e.g., NPL 1).

Meanwhile, the IEEE802.11n standard achieves a propagation speed of up to 600 Mbits/s by using MIMO (Multiple Input Multiple Output) that uses a plurality of antennas to perform space-division multiplexing in the 2.4 GHz band or the 5 GHz band or a channel bonding technique that simultaneously uses two 20 MHz frequency channels to provide a 40 MHz frequency channel.

Also, the IEEE802.11ac standard achieves a propagation speed of up to 6900 Mbits/s by using a channel bonding technique that simultaneously uses up to eight 20 MHz frequency channels in the 5 GHz band as a channel at a frequency of up to 160 MHz, a multi-user MIMO technique that simultaneously propagates different signals to a plurality of destinations, or the like.

In a high-speed wireless access system using a radio wave in the 2.4 GHz band or the 5 GHz, when entering a communication area of a base station, a terminal station receives a beacon signal transmitted from the base station and thereby senses the presence of the base station in order to establish wireless connection to the base station. Then, the terminal station transmits a connection request signal including predetermined information (such as a connection network name, a connection method, and a connection authentication method) to the base station. Then, the base station responds to the connection request signal to establish the wireless connection.

When switching a wireless connection destination to another base station, the terminal station issues a wireless connection request to another base station, a wireless disconnection notification to the base station currently being connected to the terminal station, and the like.

CITATION LIST

Non Patent Literature

[NPL 1] IEEE Std 802.11-2016, December 2016.

SUMMARY OF THE INVENTION

Technical Problem

In an area in which a plurality of base stations are disposed, after a terminal station establishes wireless connection to any of the base stations, a radio propagation characteristic between the base station and the terminal station may significantly vary or, due to heavy interference traffic, it may be difficult for the terminal station to receive a radio signal such as the beacon signal from the base station.

In such a wireless environment, the terminal station may determine that a current wireless connection quality is poor and switch the wireless connection destination to another connectable base station therearound. When such switching repeatedly occurred, wireless communication disconnection frequently occurred. In addition, since each of the terminal stations autonomously selects the connection destination, the connection destinations of the terminal stations were occasionally concentrated in any of the base stations to result in congestion.

An object of the present invention is to provide a wireless communication system, a control station, a base station, and a wireless communication method which allow communication to be stabilized even in a range at which radio waves arrive from a plurality of base stations.

Means for Solving the Problem

A wireless communication system according to an aspect of the present invention is a wireless communication system including: a plurality of base stations to which a plurality of terminal stations are connectable; and a control station that controls each of the base stations, the control station including: a network communication unit that receives, from each of the base stations, base station information indicating the base station, wireless environment information indicating a reception signal received by the base station from another of the base stations and a signal intensity thereof, and terminal station information indicating the terminal station connected to the base station and a signal intensity; and a calculation unit that calculates, based on the base station information, the wireless environment information, and the terminal station information each received from each of the base stations, connection control information for controlling a connection permission from each of the base stations to each of the terminal stations, each of the base stations including: a connection control unit that controls, based on the connection control information, the connection permission to each of the terminal stations.

A control station according to the aspect of the present invention is a control station that controls each of a plurality of base stations to which a plurality of terminal stations are connectable, the control station including: a network communication unit that receives, from each of the base stations, base station information indicating the base station, wireless environment information indicating a reception signal received by the base station from another of the base stations and a signal intensity thereof, and terminal station information indicating the terminal station connected to the base station and a signal intensity; and a calculation unit that calculates, based on the base station information, the wireless environment information, and the terminal station information each received from each of the base stations, connection control information for controlling a connection permission from each of the base stations to each of the terminal stations, the network communication unit transmitting the connection control information to each of the base stations.

A base station according to the aspect of the present invention is a base station to which a plurality of terminal stations are connectable and which is controlled, together with another base station, by a control station, the base station including: a storage unit that stores base station information indicating the base station; a collection unit that collects wireless environment information indicating a signal from the other base station and a signal intensity thereof and terminal station information indicating the terminal station connected to the base station and a signal intensity; a network communication unit that transmits, to the control station, the base station information, the wireless environment information, and the terminal station information and receives connection control information for controlling a connection permission from the base station to each of the terminal stations, the connection control information being calculated by the control station based on the base station information, the wireless environment information, and the terminal station information; and a connection control unit that controls, based on the connection control information, the connection permission to each of the terminal stations.

A wireless communication method according to the aspect of the present invention is a wireless communication method for connecting a plurality of base stations to be controlled by a control station and a plurality of terminal stations, the wireless communication method including: a reception step of the control station receiving, from each of the base stations, base station information indicating the base station, wireless environment information indicating a reception signal received by the base station from another of the base stations and a signal intensity thereof, and terminal station information indicating the terminal station connected to the base station and a signal intensity; a calculation step of the control station calculating, based on the base station information, the wireless environment information, and the terminal station information each received from each of the base stations, connection control information for controlling a connection permission from each of the base stations to each of the terminal stations; and a connection control step of each of the base stations controlling, based on the connection control information, the connection permission to each of the terminal stations.

BRIEF DESCRIPTION OF DRAWINGS

FIG. 3 is a diagram illustrating an example of wireless environment information collected by a first collection unit.

FIG. 4 is a diagram illustrating an example of terminal station information collected by a second collection unit.

FIG. 5 is a diagram illustrating an example of base station information of a host station stored in a storage unit.

FIG. 6 is a diagram illustrating a first example of connection destination control information calculated by a connection destination control unit.

FIG. 9 is a diagram illustrating an example of area overlap information calculated by a calculation unit.

FIG. 10 is a diagram illustrating an example of connection destination information calculated by the calculation unit.

FIG. 11 is a diagram illustrating a first example of connection control information calculated by the calculation unit.

FIG. 12 is a diagram illustrating a second example of the connection control information calculated by the calculation unit.

DESCRIPTION OF EMBODIMENTS

Figure 1:
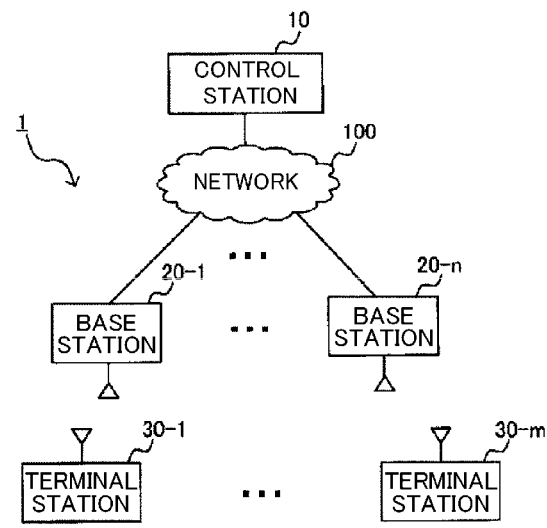
FIG. 1 is a diagram illustrating an example of a configuration of a wireless communication system according to an embodiment.

Referring to the drawings, an embodiment of a wireless communication system will be described below. FIG. 1 is a diagram illustrating an example of a configuration of a wireless communication system 1 according to the embodiment. As illustrated in FIG. 1, in the wireless communication system 1, e.g., a control station 10 and n (n is an integer of not less than 2) base stations 20-1 to 20-$n$ are connected via a network 100. Also, in the wireless communication system 1, with each of the base stations 20-1 to 20-$n$, m (m is an integer of not less than 2) terminal stations 30-1 to 30-$m$ are communicative.

In other words, each of the terminal stations 30-1 to 30-$m$ performs wireless communication with any one of the base stations 20-1 to 20-$n$. Unless any of a plurality of components, such as the base stations 20-1 to 20-$n$, is specified, each of the components is simply referred to in an abbreviated manner, such as the base station 20.

Figure 2:
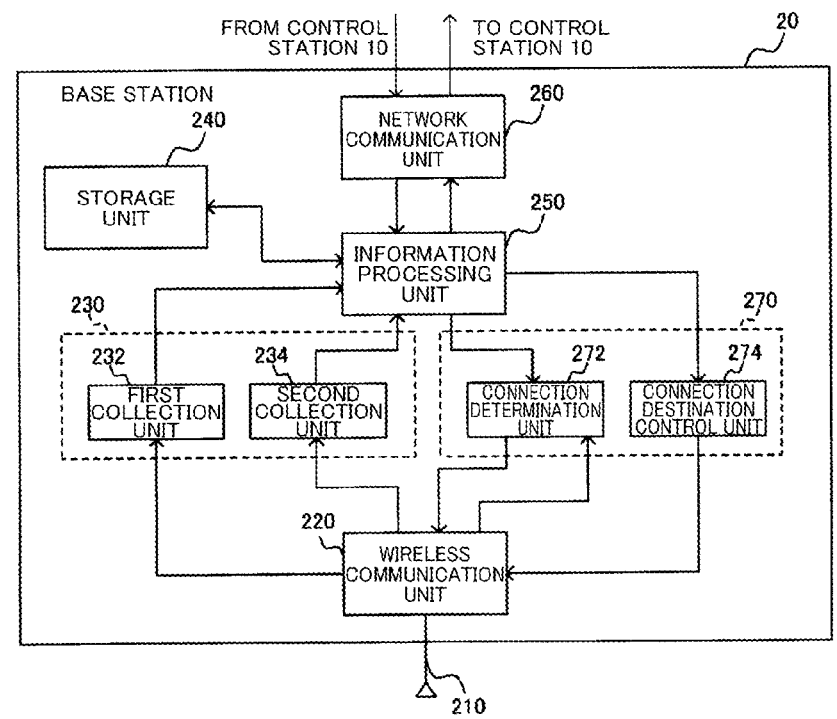
FIG. 2 is a diagram illustrating an example of a configuration of a base station according to the embodiment.

First, a description will be given of each of the base stations 20. FIG. 2 is a diagram illustrating an example of a configuration of the base station 20 according to the embodiment. As illustrated in FIG. 2, the base station 20 has an antenna 210, a wireless communication unit 220, a collection unit 230, a storage unit 240, an information processing unit 250, a network communication unit 260, and a connection control unit 270. Note that, in FIG. 2, other functional blocks typically included in the base station are not illustrated.

The antenna 210 includes an antenna element that transmits/receives a radio wave and the like. The wireless communication unit 220 performs, via the antenna 210, transmission/reception of a radio signal to/from each of the terminal station 30 and another of the base stations 20. For example, the wireless communication unit 220 outputs information received from the terminal station 30 to the collection unit 230 and to the connection control unit 270. The wireless communication unit 220 also outputs a wireless connection request received from the terminal station 30 to the connection control unit 270 and transmits information input thereto from the connection control unit 270 to the terminal station 30.

The collection unit 230 includes a first collection unit 232 and a second collection unit 234, collects information from the terminal station 30 and from the base station 20 via the wireless communication unit 220, and outputs the collected information to the information processing unit 250.

The first collection unit 232 has a function of a wireless environment information collection unit that collects, via the wireless communication unit 220, wireless environment information from another peripheral one of the base stations 20 from which a radio wave arrives at the host station (the base station 20).

FIG. 3 is a diagram illustrating an example of the wireless environment information collected by the first collection unit 232. As illustrated in FIG. 3, the wireless environment information is information obtained by collecting base station wireless information produced based on a beacon signal received from another of the base stations 20 that is located around the host station or the like by using a BSSID (Basic Service Set Identifier) of the host station as receiver information.

The base station wireless information includes information including ESSID (Extended Service Set Identifier hereinafter simply referred to as SSID) of each of the other base stations 20 located around the host station, the BSSID thereof, RSSI (Received Signal Strength Indicator) between the base stations, and a channel. It is assumed herein that the wireless environment information also includes base station wireless information of the plurality of base stations 20 each having the same SSID.

The second collection unit 234 (FIG. 2) has a function of a terminal station information collection unit that collects, via the wireless communication unit 220, terminal station information from the terminal station 30 from which a radio wave arrives at the host station.

FIG. 4 is a diagram illustrating an example of the terminal station information collected by the second collection unit 234. As illustrated in FIG. 4, the terminal station information is information obtained by collecting terminal station wireless information and terminal station performance information from the terminal station 30 located around the host station by using the BSSID of the host station as acquirer information.

The terminal station wireless information includes information such as a MAC address of the terminal station 30 and the RSSI between the host station and the terminal station 30. In other words, the base station 20 being connected to the terminal station 30 specified by the MAC address is shown by the BSSID. The terminal station performance information includes information indicating whether or not the terminal station 30 is compliant with 802.11v and the like.

The storage unit 240 (FIG. 2) stores base station information indicating the host station, information input to the information processing unit 250, and the like and outputs the information in response to an access from the information processing unit 250.

FIG. 5 is a diagram illustrating an example of the base station information of the host station stored in the storage unit 240. As illustrated in FIG. 5, the base station information includes base station main body information of the host station, wireless interface information, and the like. The base station main body information includes information indicating the MAC address of the host station, the number of wireless interfaces of the host station, and the like. The wireless interface information includes information indicating the respective MAC addresses of the wireless interfaces, operating channels, and the like.

The information processing unit 250 (FIG. 2) performs information processing in the base station 20. For example, the information processing unit 250 outputs the information collected by the collection unit 230 to the storage unit 240 and to the network communication unit 260. The information processing unit 250 also outputs the information stored in the storage unit 240 to the network communication unit 260 and outputs information input thereto from the network communication unit 260 to the connection control unit 270.

In a specific example, the information processing unit 250 outputs, to the network communication unit 260, the wireless environment information and the terminal station information each collected by the collection unit 230, the base station information stored in the storage unit 240, information indicating a state of connection of the terminal station 30 to the host station, and the like. The information processing unit 250 also outputs, to the connection control unit 270, connection control information (described later using FIGS. 11, 12, and the like) or the like input thereto from the network communication unit 260.

The network communication unit 260 is an interface that transmits, to the control station 10, the information input thereto from the information processing unit 250, receives the information transmitted from the control station 10, and outputs the received information to the information processing unit 250.

The connection control unit 270 includes a connection determination unit 272 and a connection destination control unit 274 and controls, based on the connection control information (described later using FIGS. 11, 12, and the like) input thereto from the information processing unit 250 and via the wireless communication unit 220, connection of the terminal station 30 to the host station.

For example, the connection determination unit 272 determines, based on the setting of connection control on the terminal station 30 which is input thereto from the information processing unit 250 and on the terminal station information, whether connection is to be permitted or refused in response to a wireless connection request from the terminal station 30 which is input thereto from the wireless communication unit 220. Then, the connection determination unit 272 transmits a response based on a result of the determination to the terminal station 30 via the wireless communication unit 220.

The connection destination control unit 274 calculates the connection destination control information based on the connection control information input thereto from the information processing unit 250 and controls, using the connection destination control information, wireless connection (switching of the connection destination) of the terminal station 30 subordinate to the host station via the wireless communication unit 220.

Figures 7, 8:
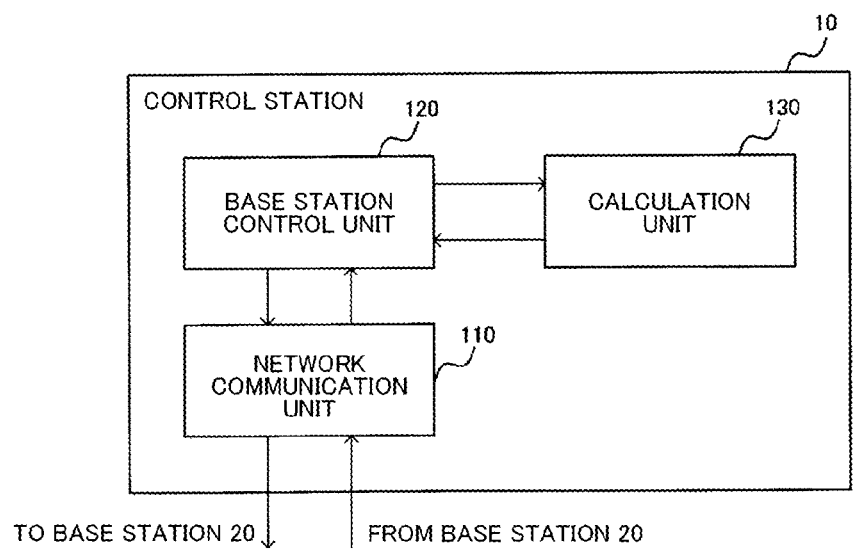
FIG. 7 is a diagram illustrating a second example of the connection destination control information calculated by the connection destination control unit.
FIG. 8 is a diagram illustrating an example of a configuration of a control station according to the embodiment.

FIG. 6 is a diagram illustrating a first example of the connection destination control information calculated by the connection destination control unit 274. FIG. 7 is a diagram illustrating a second example of the connection destination control information calculated by the connection destination control unit 274. The connection destination control information includes information such as a connection control target terminal station, a connection control method, a connection switch destination BSSID, and a connection switch destination channel. When the connection control method is 802.11v, the connection switch destination BSSID and the connection switch destination channel are specified. When the connection control method is Disassociation, the connection switch destination BSSID and the connection switch destination channel need not be set.

Next, a description will be given of the control station 10. FIG. 8 is a diagram illustrating an example of a configuration of the control station 10 according to the embodiment. As illustrated in FIG. 8, the control station 10 includes a network communication unit 110, a base station control unit 120, and a calculation unit 130. Note that, in FIG. 8, other functional blocks typically included in the control station are not illustrated.

The network communication unit 110 is an interface that receives information transmitted from each of the base stations 20-1 to 20-*n*, outputs the received information to the base station control unit 120, and transmits information input thereto from the base station control unit 120 to each of the base stations 20-1 to 20-*n*.

In a specific example, the network communication unit 110 receives the wireless environment information (see FIG. 3), the terminal station information (see FIG. 4), and the base station information (see FIG. 5) from each of the base stations 20-1 to 20-*n*, information indicating states of connection of the terminal stations 30 to the individual base stations 20-1 to 20-*n*, and the like. The network communication unit 110 also transmits the connection control information described later to each of the base stations 20-1 to 20-*n*.

The base station control unit 120 outputs, to the calculation unit 130, the information (the wireless environment information, the terminal station information, and the base station information) received by the network communication unit 110 and outputs, to the network communication unit 110, a calculation result (the connection control information) output from the calculation unit 130.

The calculation unit 130 calculates, based on the information (the wireless environment information, the terminal station information, and the base station information) input thereto from the base station control unit 120, area overlap information (described later using FIG. 9), connection destination information (described later using FIG. 10), and the connection control information (described later using FIGS. 11 and 12) and outputs the connection control information as the calculation result to the base station control unit 120.

FIG. 9 is a diagram illustrating an example of the area overlap information calculated by the calculation unit 130. As illustrated in FIG. 9, the calculation unit 130 calculates, based on the wireless environment information collected by each of the base stations 20-1 to 20-*n* subordinate to the control station 10, the area overlap information including the signal intensity (RSSI) of the radio signal received between the individual base stations and a result of determination (affirmative or negative) of whether or not respective areas (cells) of the base stations 20 are regarded as overlapping each other.

For example, when the RSSI is not less than a predetermined threshold (e.g., −80 dBm), the calculation unit 130 determines that the respective areas of the base stations 20 overlap each other and, when the RSSI is less than the threshold, the calculation unit 130 determines that the respective areas of the base stations 20 do not overlap each other.

FIG. 10 is a diagram illustrating an example of the connection destination information calculated by the calculation unit 130. As illustrated in FIG. 10, the calculation unit 130 calculates the connection destination information in which the base stations 20 connection to which is to be permitted and the base stations 20 connection to which is to be inhibited are set to each of the terminal stations 30-1 to 30-*m*.

For example, the calculation unit 130 calculates, for each of the terminal stations 30 and based on information indicating the base station 20 as a current connection destination thereof, the connection destination information that permits connection of the terminal station 30 to the base station 20 currently being connected thereto and to another of the base stations 20 having an area overlapping that of the base station 20 currently being connected to the terminal station 30 with a signal intensity of not less than a predetermined threshold.

The calculation unit 130 inhibits herein another of the base stations 20 having an area overlapping that of the base station 20 currently being connected to the terminal station 30 with a signal intensity of less than the predetermined threshold from being connected to the terminal station 30 currently being connected to the base station 20.

In other words, by using the connection destination information, it is possible to perform connection control based on a position of the terminal station 30 relative to each of the base stations 20-1 to 20-*n*.

For example, by using the connection destination information, it is possible to set, for each of the base stations 20-1 to 20-*n*, whether each of the terminal stations 30 is the "connection permitted terminal station" or the "connection inhibited terminal station". As information indicating the "connection permitted terminal station" and the "connection inhibited terminal station", the calculation unit 130 calculates the connection control information (see FIGS. 11 and 12) described later or the like.

Note that, when the number of the terminal stations 30 connected to any of the base stations 20 is large, the calculation unit 130 may also set, based on the terminal station information, connection inhibition to the base station 20 being connected thereto and connection permission to the base station 20 having the overlapping area in combination and thereby switch the connection destination of the terminal stations 30 to another of the base stations 20.

For example, when the terminal stations 30 the number of which is not less than a preset number (threshold) are connected to the base station 20, it may also be possible to change connection permissions given to a given number (e.g., a half of the number of the connected terminal stations) of the terminal stations 30 to connection refusals (inhibitions) and promote switching of the connection destinations to the other peripheral base stations 20.

At this time, the terminal stations 30 the connection destinations of which are to be switched may be extracted at random, selected in ascending order of a time period elapsed from connection, or selected in ascending order of the RSSI.

In a specific example, in the previous description given above, the terminal station 30 is permitted to be connected to the base station 20 currently being connected thereto and to the other base station 20 having the area overlapping that of the base station 20 currently being connected thereto. Accordingly, the terminal station 30-3 in FIG. 10 is to be permitted to be connected to the base station 20-1.

In the example illustrated in FIG. 10, the number (threshold) of the terminal stations permitted to be connected to the base station 20-1 is set to, e.g., 2, inhibition of connection of the terminal station 30-3 to the base station 20-1 is set, and permission of connection of the terminal station 30-3 to the base station 20-2 is set. As a result, the connection destination of the terminal station 30-3 is switched from the base station 20-1 to the base station 20-2.

Also, in the example illustrated in FIG. 10, either of permission of connection to the base station 20 or inhibition of connection to the base station 20 is set to each of the terminal stations 30, but the setting is not limited thereto.

For example, the calculation unit 130 may also calculate the connection destination information such that the base station 20 to which neither permission of connection nor inhibition of connection to the terminal station 30 is set is included therein. In this case, it is possible to reduce the number of the terminal stations 30 included in the connection destination information or the like and reduce an amount of information for connection control as well as an amount of determination processing in each of the base stations 20.

FIG. 11 is a diagram illustrating a first example of the connection control information calculated by the calculation unit 130. FIG. 12 is a diagram illustrating a second example of the connection control information calculated by the calculation unit 130. The connection control information includes information such as control execution timing, a terminal list method, a terminal list, connection-inhibited-terminal-station connection, a connection-inhibited-terminal-station connection determination period, and the number of times of connection-inhibited-terminal-station connection determination.

The control execution timing is information indicating timing with which the base station 20 having received the connection control information executes processing indicated by the connection control information, which specifies, e.g., immediately, execution date and time, or the like.

The terminal list method is information for setting a connection inhibition list or a connection permission list. When the connection inhibition list is set, connection of the terminal stations 30 shown in the terminal list is inhibited. When the connection permission list is set, connection of the terminal stations 30 shown in the terminal list is permitted.

The connection-inhibited-terminal-station connection is information for setting inhibition of connection or conditional permission of connection as an operation when a connection request is received from the terminal station 30 inhibited from being connected. When the conditional permission is to be set, the base station 20 determines whether or not connection requests the number of which is not less than the number of times of connection-inhibited-terminal-station connection determination have been issued within the connection-inhibited-terminal-station connection determination period. It is assumed that, when each of the conditions is satisfied, the base station 20 permits connection. At this time, the base station 20 updates the terminal information thereof and gives the updated terminal information to the control station 10.

While the case where either the connection inhibition list or the connection permission list is set as the terminal list method has been described, each of the connection inhibition list and the connection permission list has an advantage and a drawback, and therefore it may also be possible to selectively use the connection inhibition list or the connection permission list depending on an environment to which the connection inhibition list or the connection permission list is to be applied.

When the connection inhibition list is set, it is assumed that, in a typical wireless communication system, the number of the terminal stations 30 is larger than the number of the base stations 20. Accordingly, it is considered that the number of the terminal stations 30 to be set to each of the base stations 20 is large. In other words, it is considered that the amount of the information for connection control and an amount of processing for connection control in each of the base stations 20 are large. However, when the new terminal station 30 which is not included in any of the terminal station information sets collected by the base stations 20 issues a connection request, the new terminal station 30 is smoothly allowed to be connected without encountering a connection refusal.

Meanwhile, when the connection permission list is set, the number of the terminal stations 30 included in the terminal list can be reduced, and the amount of the information for connection control and the amount of the processing for connection control in each of the base stations 20 can be reduced. However, when the new terminal station 30 issues a connection request, it is impossible to determine whether the new terminal station 30 is the terminal station 30 to which a connection refusal is to be given by the base station 20 (whether the terminal station 30 is to be connected to the other base station 20) or whether the new terminal station 30 is the terminal station 30 not included in any of the terminal station information sets collected by the base stations 20. At this time, it follows that the base station 20 temporarily refuses to be connected (when the connection-inhibited-terminal-station connection is "conditionally permitted"), and it is considered that the terminal station 30 cannot smoothly be connected.

As described above, through the use of the connection control information by the base station 20, the terminal station 30 can be connected to the base station 20 being connected thereto or to the other base station 20 having the area overlapping that of the base station 20 being connected thereto, but cannot be connected to the other base stations 20. Therefore, it is possible to stabilize the base station as the connection destination of the terminal station 30.

However, when the terminal station 30 moves into the area of any of the other base stations 20 having the area not overlapping the area of the currently connected base station 20, if no measures are taken, the terminal station 30 cannot be connected. Accordingly, each of the base stations 20 monitors a situation in which the terminal station 30 is connected thereto and, when the terminal station 30 connected to the base station 20 switches the connection destination to another of the base stations 20, the base station 20 notifies the control station 10 of the switching of the connection destination. Then, when receiving the notification that the terminal station 30 has switched the connection destination, the control station 10 gives new connection control information to each of the base stations 20 to update the connection control information for the terminal station 30 in the base station 20.

For example, when the network communication unit 110 receives, from the base station 20, switch information indicating that the terminal station 30 subordinate thereto has switched the connection destination base station, the calculation unit 130 of the control station 10 performs calculation to update the connection control information for each of the base stations 20.

At this time, the connection control unit 270 of each of the base stations 20 controls, based on the connection control information after the calculation unit 130 of the base station 10 performed the calculation for the updating, a connection permission to each of the terminal stations 30.

Figure 13:
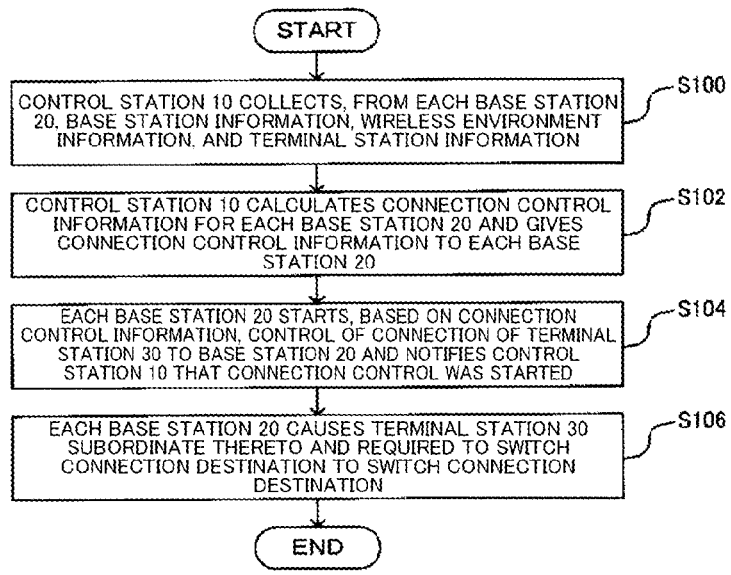
FIG. 13 is a flow chart illustrating an outline of connection control in the wireless communication system.

Next, a description will be given of an operation of the wireless communication system 1. FIG. 13 is a flow chart illustrating an outline of connection control in the wireless communication system 1.

First, the control station 10 collects, from each of the base stations 20, the base station information, the wireless environment information, and the terminal station information (S100).

Then, the control station 10 calculates the connection control information for each of the base stations 20 and gives the connection control information to each of the base stations 20 (S102). Note that processing in which the control station 10 calculates the connection control information is illustrated in FIG. 14.

Each of the base stations 20 starts, based on the connection control information, control of connection of the terminal station 30 thereto and notifies the control station 10 that the connection control was started (S104)

Figure 15:
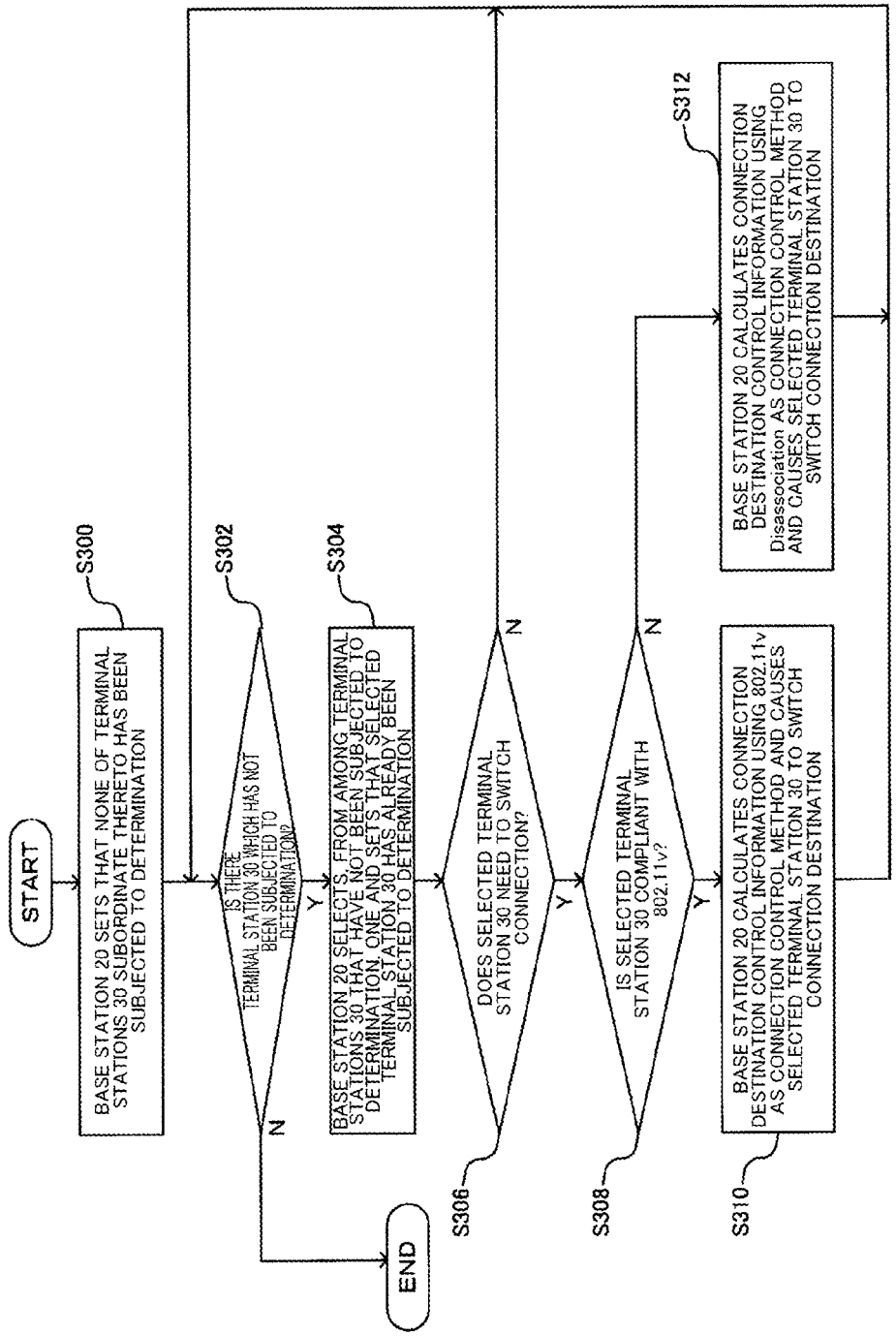
FIG. 15 is a flow chart illustrating processing in which the base station causes a terminal station currently being connected thereto to switch a connection destination.

Then, each of the base stations 20 causes the terminal station 30 subordinate thereto and required to switch the connection destination to switch the connection destination (S106). Note that processing in which the base station 20 causes the terminal station 30 being connected thereto to switch the connection destination is illustrated in FIG. 15.

Figure 14:
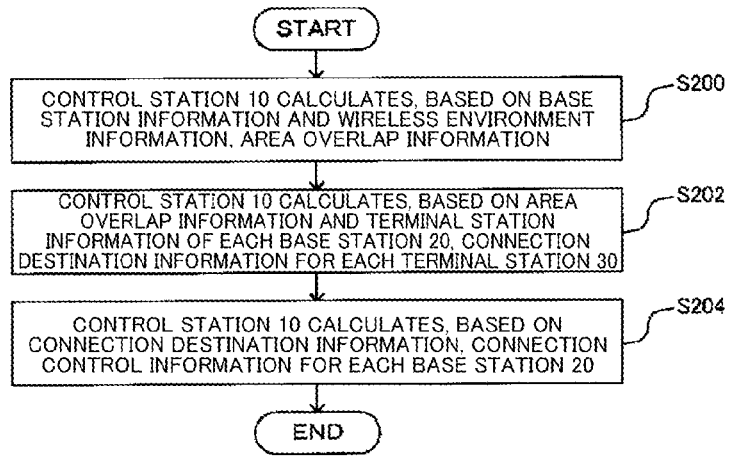
FIG. 14 is a flow chart illustrating processing in which the control station calculates the connection control information.

FIG. 14 is a flow chart illustrating processing in which the control station 10 calculates the connection control information. First, the control station 10 calculates, based on the base station information and the wireless environment information, the area overlap information (S200).

Then, the control station 10 calculates, based on the area overlap information and the terminal station information of each of the base stations 20, the connection destination information for each of the terminal stations 30 (S202).

Then, the control station 10 calculates, based on the connection destination information, the connection control information for each of the base stations 20 (S204).

FIG. 15 is a flow chart illustrating processing in which the base station 20 causes the terminal station 30 being connected thereto to switch the connection destination. First, the base station 20 sets that none of the terminal stations 30 subordinate thereto has been subjected to determination (S300).

Then, the base station 20 determines whether or not there is the terminal station 30 which is subordinate thereto and has not been subjected to determination (S302). When there is such a terminal station 30 (Yes in S302), the base station 20 advances to processing in S304. When there is no such terminal station 30 (No in S302), the base station 20 ends the processing.

The base station 20 selects, from among the terminal stations 30 that have not been subjected to determination, one and sets that the selected terminal station 30 has already been subjected to determination (S304).

The base station 20 determines whether or not the selected terminal station 30 needs to switch the connection by checking the connection control information set to the base station 20 against the MAC address of the selected terminal station 30 (S306). When determining that the selected terminal station 30 needs to switch the connection (Yes in S306), the base station 20 advances to processing in S308. When determining that the selected terminal station 30 need not switch the connection (No in S306), the base station 20 returns to the processing in S302.

Next, the base station 20 determines, based on the terminal station information, whether or not the selected terminal station 30 is compliant with 802.11v (S308). When determining that the terminal station 30 is compliant with 802.11v (Yes in S308), the base station 20 advances to processing in S310. In other cases (No in S308), the base station 20 advances to processing in S312.

In the processing in S310, the base station 20 calculates the connection destination control information using 802.11v as the connection control method and causes the selected terminal station 30 to switch the connection destination.

In the processing in S312, the base station 20 calculates the connection destination control information using Disassociation as the connection control method and causes the selected terminal station 30 to switch the connection destination.

Figure 16:
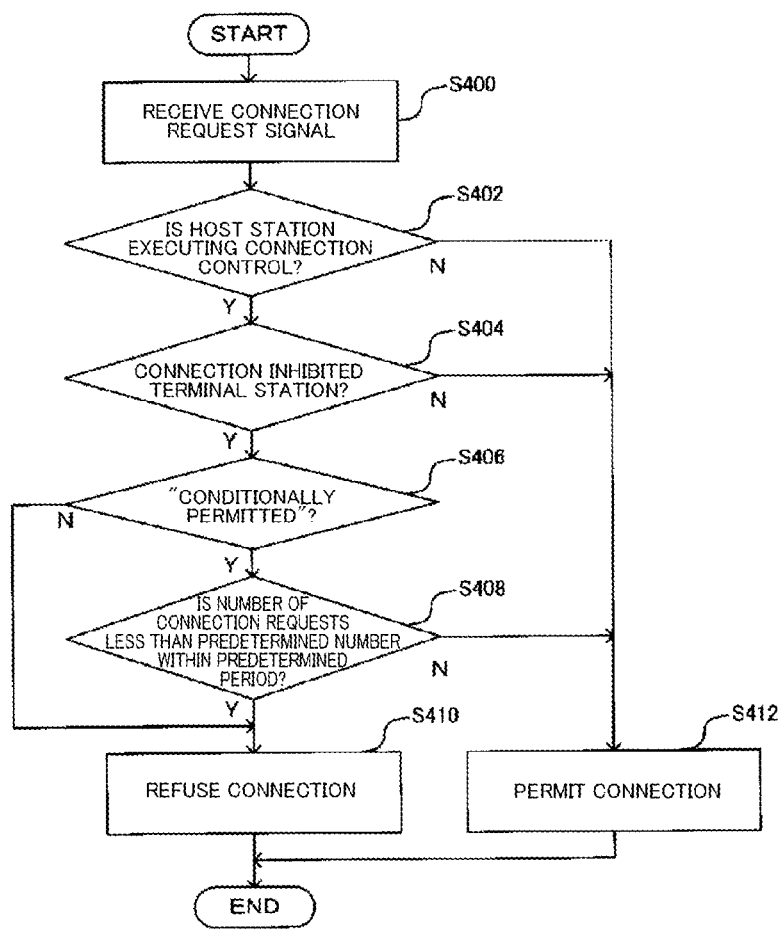
FIG. 16 is a flow chart illustrating control to be performed by the base station when receiving a new connection request from the terminal station.

FIG. 16 is a flow chart illustrating control to be performed by the base station 20 when receiving a new connection request from the terminal station 30.

First, when receiving a connection request signal from the terminal station 30 (S400), the base station 20 determines whether or not the base station 20 is executing the connection control on the terminal station 30 (S402). When the connection control is being performed (Yes in S402), the base station 20 advances to processing in S404. When the connection control is not being performed (No in S402), the base station 20 advances to processing in S412.

In the processing in S404, the base station 20 determines, based on the MAC address of the terminal station 30 and on the connection control information set to the base station 20, whether or not the terminal station 30 having transmitted the connection request signal corresponds to a connection inhibited terminal station inhibited from being connected to the base station 20. When determining that the terminal station 30 corresponds to the connection inhibited terminal station (Yes in S404), the base station 20 advances to processing in S406. When determining that the terminal station 30 does not correspond to the connection inhibited terminal station (No in S404), the base station 20 advances to processing in S412.

In the processing in S406, the base station 20 determines whether or not the "connection-inhibited-terminal-station connection" in the connection control information set to the base station 20 is "conditionally permitted". When determining that the "connection-inhibited-terminal-station connection" is "conditionally permitted" (Yes in S406), the base station 20 advances to processing in S408. When determining that the "connection-inhibited-terminal-station connection" is not "conditionally permitted" (No in S406), the base station 20 advances to processing in S410.

In the processing in S408, the base station 20 determines whether or not the number of the connection requests received thereby from the terminal station 30 having transmitted the connection requests is less than the number of times of connection-inhibited-terminal connection determination within the connection-inhibited-terminal-station connection determination period in the connection control information set to the base station 20. When determining that the number of the connection requests is less than the number of times of connection-inhibited-terminal connection determination (Yes in S408), the base station 20 advances to processing in S410. In other cases (No in S408), the base station 20 advances to processing in S412.

In the processing in S410, the base station 20 refuses to be connected to the terminal station 30 having transmitted the connection request signal.

In the processing in S412, the base station 20 permits the terminal station 30 having transmitted the connection request signal to be connected thereto.

Thus, even while executing the connection control on the terminal station 30, under the setting of being conditionally permitted as described above, the base station 20 can permit the terminal station 30 having repeatedly issued the connection requests the number of which is not less than the predetermined number within the connection-inhibited-terminal-station connection determination period to be connected thereto. This allows the wireless communication system 1 to prevent a situation in which, when the terminal station 30 has repeatedly issued the connection requests to the same base station 20, the terminal station 30 is not allowed to be connected thereto.

The base station 20 may also be configured to control a response in the same manner as in the processing illustrated in FIG. 16 even when the base station 20 receives an "inquiry request" (e.g., a probe request signal) from the terminal station 30.

In this case, to give consideration to randomization of the MAC address (transmission of an inquiry request signal using an address different from the MAC address used in communication) of the terminal station 30, in the determination of whether or not the terminal station 30 of concern is the connection inhibited terminal station (S404), the base station 20 may also further determine whether or not a transmitter MAC address of the inquiry request signal is, e.g., a local address.

When the transmitter MAC address is the local address, even when the MAC address of concern is not included in the connection permission list, the base station 20 returns a response to the inquiry request to be able to avoid a situation in which a request from the terminal station 30 to be originally permitted is erroneously refused due to the randomized MAC address.

Thus, the wireless communication system 1 can stabilize communication of each of the terminal stations 30 based on the connection control information even in a range at which radio waves from the plurality of base stations 20 arrive. In addition, in the wireless communication system 1, the control station 10 acquires, from the plurality of base stations 20, the terminal station information of each of the terminal stations 30 and transmits the connection control information to each of the base stations 20. Therefore, it is possible to stabilize the connection destination of each of the terminal stations 30 and reduce concentration of connection of the terminal stations 30 in any of the base stations 20.

Note that the control station 10, the base stations 20, and the terminal stations 30 in the embodiment described above are not limited to those implemented by dedicated devices, and may also be implemented by a versatile computer. In this case, the control station 10, the base stations 20, and the terminal stations 30 may also be implemented by recording programs for implementing respective functions thereof on a computer readable recording medium and causing a computer system to read the programs recorded on the recording medium and execute the programs.

It is assumed that the "computer system" mentioned herein include hardware such as an OS and a peripheral device. The "computer-readable recording medium" refers to a portable medium such as a flexible disk, a magneto-optical disk, a ROM, or a CD-ROM or a storage device embedded in the computer system, such as a hard disk.

The "computer-readable recording medium" may also include a recording medium that dynamically retains a program for a short period of time such as a communication line when the program is to be transmitted via a network such as the Internet or a communication line such as a telephone line or include a recording medium that retains the program for a given period of time such as a volatile memory in a computer system serving as a server or client in that case.

Also, the program described above may be a program for implementing any of the functions described above, while the functions described above may be implemented by a combination of the program described above and a program already recorded in the computer system. The program described above may also be a program to be implemented using hardware such as a PLD (Programmable Logic Device) or a FPGA (Field Programmable Gate Array).

While the embodiment of the present invention has been described above with reference to the drawings, it is obvious that the embodiment described above is merely an example of the present invention, and the present invention is not limited to the embodiment described above. Therefore, additions, omissions, substitutions, and other modifications of the components may be performed without departing from the technical idea and scope of the present invention.

REFERENCE SIGNS LIST

1 Wireless communication system
10 Control station
20-1 to 20-$n$ Base stations
30-1 to 30-$m$ Terminal stations
100 Network
110 Network communication unit
120 Base station control unit
130 Calculation unit
210 Antenna
220 Wireless communication unit
230 Collection unit
232 First collection unit
234 Second collection unit
240 Storage unit
250 Information processing unit
260 Network communication unit
270 Connection control unit
272 Connection determination unit
274 Connection destination control unit

The invention claimed is:

1. A wireless communication system comprising:
a plurality of base stations to which a plurality of terminal stations are connectable; and
a control station that controls each of the base stations, the control station including:
a network communication unit, including one or more processors, configured to receive, from each of the base stations, base station information indicating the base station, wireless environment information indicating a reception signal received by the base station from another of the base stations and a signal intensity thereof, and terminal station information indicating the terminal station connected to the base station and a signal intensity; and
a calculation unit, including one or more processors, configured to calculate, based on (i) the base station information, (ii) the wireless environment information, and (iii) the terminal station information each received from each of the base stations, connection control information for controlling a connection permission from each of the base stations to each of the terminal stations, wherein the connection control information is calculated so as to cause the base station currently being connected to the terminal station and another of the base stations having an area overlapping that of the base station currently being connected to the terminal station with a signal intensity of not less than a predetermined value to permit connection from the terminal station,
each of the base stations including:
a connection control unit, including one or more processors, configured to control, based on the connection control information, the connection permission to each of the terminal stations.

2. The wireless communication system according to claim 1, wherein the calculation unit is configured to calculate the connection control information such that, when a number of the terminal stations connected to the base station currently being connected to the terminal station is not less than a predetermined value and there is another of the base stations having an area overlapping that of the base station currently being connected to the terminal station with a signal intensity of not less than a predetermined value, the base station currently being connected to the terminal station inhibits the terminal station from being connected thereto.

3. The wireless communication system according to claim 1, wherein the calculation unit is configured to calculate, as the connection control information, at least one of a connection permission list that specifies the terminal stations to be permitted to be connected to the base station and a connection inhibition list that specifies the terminal stations to be inhibited from being connected to the base station.

4. The wireless communication system according to claim 3, wherein,
when the network communication unit receives, from the base station, switch information indicating that the terminal station subordinate to the base station has switched a connection destination base station, the calculation unit is configured to perform a calculation to update the connection control information for each of the base stations and
each of the connection control units are configured to control, based on the connection control information after the calculation unit performs the calculation for updating, the connection permission to each of the terminal stations.

5. The wireless communication system according to claim 1, wherein,
when the control station receives, from the base station, switch information indicating that the terminal station subordinate to the base station has switched a connection destination base station,
the calculation unit is configured to perform a calculation to update the connection control information for each of the base stations; and
the connection control unit is configured to control, based on the connection control information after the calculation for updating is performed, the connection permission to each of the terminal stations.

6. A wireless communication method for connecting a plurality of base stations to be controlled by a control station and a plurality of terminal stations, the wireless communication method comprising:
receiving, from each of the base stations and by the control station, base station information indicating the base station, wireless environment information indicating a reception signal received by the base station from another of the base stations and a signal intensity thereof, and terminal station information indicating the terminal station connected to the base station and a signal intensity;
calculating, by the control station, based on (i) the base station information, (ii) the wireless environment information, and (iii) the terminal station information each received from each of the base stations, connection control information for controlling a connection permission from each of the base stations to each of the terminal stations, wherein the connection control information is calculated so as to cause the base station currently being connected to the terminal station and another of the base stations having an area overlapping that of the base station currently being connected to the terminal station with a signal intensity of not less than a predetermined value to permit connection from the terminal station; and
controlling, based on the connection control information and by each of the base stations, the connection permission to each of the terminal stations.

7. The wireless communication method according to claim 6, wherein,
when the control station receives, from the base station, switch information indicating that the terminal station subordinate to the base station has switched a connection destination base station,
performing calculation to update the connection control information for each of the base stations and
controlling, based on the connection control information after the calculation for updating is performed, the connection permission to each of the terminal stations.

8. The wireless communication method according to claim 6, wherein the calculating comprises calculating the connection control information such that, when a number of the terminal stations connected to the base station currently being connected to the terminal station is not less than a predetermined value and there is another of the base stations having an area overlapping that of the base station currently being connected to the terminal station with a signal intensity of not less than a predetermined value, the base station currently being connected to the terminal station inhibits the terminal station from being connected thereto.

9. The wireless communication method according to claim 6, wherein the calculating comprises calculating, as the connection control information, at least one of a connection permission list that specifies the terminal stations to be permitted to be connected to the base station and a connection inhibition list that specifies the terminal stations to be inhibited from being connected to the base station.

10. The wireless communication method according to claim 9, wherein,
when receiving, from the base station, switch information indicating that the terminal station subordinate to the base station has switched a connection destination base station, performing a calculation to update the connection control information for each of the base stations and
controlling based on the connection control information after performing the calculation for updating, the connection permission to each of the terminal stations.

11. One or more non-transitory computer-readable media storing software comprising instructions executable by one or more computers which, upon such execution, cause the one or more computers to perform operations comprising:
connecting a plurality of base stations to be controlled by a control station and a plurality of terminal stations, the connecting comprising:
receiving, from each of the base stations and by the control station, base station information indicating the base station, wireless environment information indicating a reception signal received by the base station from another of the base stations and a signal intensity thereof, and terminal station information indicating the terminal station connected to the base station and a signal intensity;
calculating, by the control station, based on (i) the base station information, (ii) the wireless environment information, and (iii) the terminal station information each received from each of the base stations, connection control information for controlling a connection permission from each of the base stations to each of the terminal stations, wherein the connection control information is calculated so as to cause the base station currently being connected to the terminal station and another of the base stations having an area overlapping that of the base station currently being connected to the terminal station with a signal intensity of not less than a predetermined value to permit connection from the terminal station; and controlling, based on the connection control information and by each of the base stations, the connection permission to each of the terminal stations.

12. The one or more non-transitory computer-readable media 11, wherein the calculating comprises calculating the connection control information such that, when a number of the terminal stations connected to the base station currently being connected to the terminal station is not less than a predetermined value and there is another of the base stations having an area overlapping that of the base station currently being connected to the terminal station with a signal intensity of not less than a predetermined value, the base station currently being connected to the terminal station inhibits the terminal station from being connected thereto.

13. The one or more non-transitory computer-readable media 11, wherein the calculating comprises calculating, as the connection control information, at least one of a connection permission list that specifies the terminal stations to be permitted to be connected to the base station and a connection inhibition list that specifies the terminal stations to be inhibited from being connected to the base station.

14. The one or more non-transitory computer-readable media 13, wherein, when receiving, from the base station, switch information indicating that the terminal station subordinate to the base station has switched a connection destination base station, performing a calculation to update the connection control information for each of the base stations and controlling based on the connection control information after performing the calculation for updating, the connection permission to each of the terminal stations.

15. The one or more non-transitory computer-readable media 11, wherein, when receiving, from the base station, switch information indicating that the terminal station subordinate to the base station has switched a connection destination base station, performing calculation to update the connection control information for each of the base stations and controlling, based on the connection control information after the calculation for updating is performed, the connection permission to each of the terminal stations.

* * * * *